United States Patent
Sakuma

(10) Patent No.: US 10,944,456 B1
(45) Date of Patent: Mar. 9, 2021

(54) WIRELESS COMMUNICATION DEVICE

(71) Applicant: Fujikura Ltd., Tokyo (JP)

(72) Inventor: Ken Sakuma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/864,327

(22) Filed: May 1, 2020

(51) Int. Cl.
*H04B 7/06* (2006.01)
*H04B 7/08* (2006.01)
*H04W 16/28* (2009.01)

(52) U.S. Cl.
CPC .......... *H04B 7/0617* (2013.01); *H04W 16/28* (2013.01)

(58) Field of Classification Search
CPC .... H04B 7/0617; H04B 7/0695; H04B 7/088; H04L 5/0023; H04W 16/28; H04W 72/085
See application file for complete search history.

(56) References Cited

U.S. PATENT DOCUMENTS

| | | | |
|---|---|---|---|
| 9,960,877 B2 | 5/2018 | Cordeiro et al. | |
| 2009/0160707 A1* | 6/2009 | Lakkis | H04B 7/0417 342/367 |
| 2016/0337916 A1* | 11/2016 | Deenoo | H04W 36/0088 |
| 2016/0359596 A1* | 12/2016 | Wild | H04B 7/0695 |
| 2019/0181932 A1* | 6/2019 | Jayawardene | H04B 7/0632 |
| 2019/0391620 A1* | 12/2019 | Matsuo | H02J 50/40 |

* cited by examiner

*Primary Examiner* — David S Huang
(74) *Attorney, Agent, or Firm* — Westerman, Hattori, Daniels & Adrian, LLP

(57) ABSTRACT

A wireless communication device includes a look-up table that stores a beam pattern table, and at least one beamforming antenna transmitting or receiving a radio signal with a beam pattern specified by a set of antenna weight vectors selected from the beam pattern table, where a number of antenna weight vectors for obtaining a beam pattern with a narrow half power beam width for transmission included in the beam pattern table is larger than a number of antenna weight vectors for obtaining a beam pattern with a narrow half power beam width for reception.

4 Claims, 11 Drawing Sheets

FIG. 5

| Beam No. | Direction [degree] | Angular interval [degree] | Beam No. | Direction [degree] | Angular interval [degree] |
|---|---|---|---|---|---|
| TX0 | 30.0 | | RX0 | quasi-omni beam pattern | |
| TX1 | 38.0 | 8.0 | RX1 | 30.0 | |
| TX2 | 46.0 | 8.0 | RX2 | 38.6 | 8.6 |
| TX3 | 54.0 | 8.0 | RX3 | 47.1 | 8.6 |
| TX4 | 62.0 | 8.0 | RX4 | 55.7 | 8.6 |
| TX5 | 70.0 | 8.0 | RX5 | 64.3 | 8.6 |
| TX6 | 78.0 | 8.0 | RX6 | 72.9 | 8.6 |
| TX7 | 86.0 | 8.0 | RX7 | 81.4 | 8.6 |
| TX8 | 94.0 | 8.0 | RX8 | 90.0 | 8.6 |
| TX9 | 102.0 | 8.0 | RX9 | 98.6 | 8.6 |
| TX10 | 110.0 | 8.0 | RX10 | 107.1 | 8.6 |
| TX11 | 118.0 | 8.0 | RX11 | 115.7 | 8.6 |
| TX12 | 126.0 | 8.0 | RX12 | 124.3 | 8.6 |
| TX13 | 134.0 | 8.0 | RX13 | 132.9 | 8.6 |
| TX14 | 142.0 | 8.0 | RX14 | 141.4 | 8.6 |
| TX15 | 150.0 | 8.0 | RX15 | 150.0 | 8.6 |

FIG. 8

| Beam No. | Direction [degree] | Angular interval [degree] | Beam No. | Direction [degree] | Angular interval [degree] |
|---|---|---|---|---|---|
| TX0 | 30.0 |  | RX0 | quasi-omni beam pattern |  |
|  |  | 3.9 |  |  |  |
| TX1 | 33.9 |  | RX1 | 30.0 |  |
|  |  | 3.9 |  |  | 4.0 |
| TX2 | 37.7 |  | RX2 | 34.0 |  |
|  |  | 3.9 |  |  | 4.0 |
| TX3 | 41.6 |  | RX3 | 38.0 |  |
|  |  | 3.9 |  |  | 4.0 |
| TX4 | 45.5 |  | RX4 | 42.0 |  |
|  |  | 3.9 |  |  | 4.0 |
| TX5 | 49.4 |  | RX5 | 46.0 |  |
|  |  | 3.9 |  |  | 4.0 |
| TX6 | 53.2 |  | RX6 | 50.0 |  |
|  |  | 3.9 |  |  | 4.0 |
| TX7 | 57.1 |  | RX7 | 54.0 |  |
|  |  | 3.9 |  |  | 4.0 |
| TX8 | 61.0 |  | RX8 | 58.0 |  |
|  |  | 3.9 |  |  | 4.0 |
| TX9 | 64.8 |  | RX9 | 62.0 |  |
|  |  | 3.9 |  |  | 4.0 |
| TX10 | 68.7 |  | RX10 | 66.0 |  |
|  |  | 3.9 |  |  | 4.0 |
| TX11 | 72.6 |  | RX11 | 70.0 |  |
|  |  | 3.9 |  |  | 4.0 |
| TX12 | 76.5 |  | RX12 | 74.0 |  |
|  |  | 3.9 |  |  | 4.0 |
| TX13 | 80.3 |  | RX13 | 78.0 |  |
|  |  | 3.9 |  |  | 4.0 |
| TX14 | 84.2 |  | RX14 | 82.0 |  |
|  |  | 3.9 |  |  | 4.0 |
| TX15 | 88.1 |  | RX15 | 86.0 |  |
|  |  | 3.9 |  |  | 4.0 |
| TX16 | 91.9 |  | RX16 | 90.0 |  |
|  |  | 3.9 |  |  | 4.0 |
| TX17 | 95.8 |  | RX17 | 94.0 |  |
|  |  | 3.9 |  |  | 4.0 |
| TX18 | 99.7 |  | RX18 | 98.0 |  |
|  |  | 3.9 |  |  | 4.0 |
| TX19 | 103.5 |  | RX19 | 102.0 |  |
|  |  | 3.9 |  |  | 4.0 |
| TX20 | 107.4 |  | RX20 | 106.0 |  |
|  |  | 3.9 |  |  | 4.0 |
| TX21 | 111.3 |  | RX21 | 110.0 |  |
|  |  | 3.9 |  |  | 4.0 |
| TX22 | 115.2 |  | RX22 | 114.0 |  |
|  |  | 3.9 |  |  | 4.0 |
| TX23 | 119.0 |  | RX23 | 118.0 |  |
|  |  | 3.9 |  |  | 4.0 |
| TX24 | 122.9 |  | RX24 | 122.0 |  |
|  |  | 3.9 |  |  | 4.0 |
| TX25 | 126.8 |  | RX25 | 126.0 |  |
|  |  | 3.9 |  |  | 4.0 |
| TX26 | 130.6 |  | RX26 | 130.0 |  |
|  |  | 3.9 |  |  | 4.0 |
| TX27 | 134.5 |  | RX27 | 134.0 |  |
|  |  | 3.9 |  |  | 4.0 |
| TX28 | 138.4 |  | RX28 | 138.0 |  |
|  |  | 3.9 |  |  | 4.0 |
| TX29 | 142.3 |  | RX29 | 142.0 |  |
|  |  | 3.9 |  |  | 4.0 |
| TX30 | 146.1 |  | RX30 | 146.0 |  |
|  |  | 3.9 |  |  | 4.0 |
| TX31 | 150.0 |  | RX31 | 150.0 |  |

FIG. 11

| Beam No. | Direction [degree] | Angular interval [degree] | Beam No. | Direction [degree] | Angular interval [degree] |
|---|---|---|---|---|---|
| | quasi-omni beam pattern | | | quasi-omni beam pattern | |
| TX0 | | | RX0 | | |
| TX1 | 30.0 | 8.6 | RX1 | 30.0 | 8.6 |
| TX2 | 38.6 | 8.6 | RX2 | 38.6 | 8.6 |
| TX3 | 47.1 | 8.6 | RX3 | 47.1 | 8.6 |
| TX4 | 55.7 | 8.6 | RX4 | 55.7 | 8.6 |
| TX5 | 64.3 | 8.6 | RX5 | 64.3 | 8.6 |
| TX6 | 72.9 | 8.6 | RX6 | 72.9 | 8.6 |
| TX7 | 81.4 | 8.6 | RX7 | 81.4 | 8.6 |
| TX8 | 90.0 | 8.6 | RX8 | 90.0 | 8.6 |
| TX9 | 98.6 | 8.6 | RX9 | 98.6 | 8.6 |
| TX10 | 107.1 | 8.6 | RX10 | 107.1 | 8.6 |
| TX11 | 115.7 | 8.6 | RX11 | 115.7 | 8.6 |
| TX12 | 124.3 | 8.6 | RX12 | 124.3 | 8.6 |
| TX13 | 132.9 | 8.6 | RX13 | 132.9 | 8.6 |
| TX14 | 141.4 | 8.6 | RX14 | 141.4 | 8.6 |
| TX15 | 150.0 | | RX15 | 150.0 | |

WIRELESS COMMUNICATION DEVICE

BACKGROUND OF THE INVENTION

Field of the Invention

The present invention relates to a wireless communication device.

Description of the Related Art

In order to increase the capacity of wireless communication, development of a wireless communication device using a millimeter wave band is progressing since a wider bandwidth and a higher frequency are used. For example, the 60 GHz band is used in a small cell linked with a mobile communication network or a wireless access network of a wireless Internet service provider, or a wireless backhaul link for a wireless base station, a wireless relay station, or a public wireless LAN communication access point.

In the millimeter wave band where propagation loss is large, a beam antenna having high gain and sharp directivity is generally used. In the IEEE 802.11ad standard, in consideration that a communication partner moves and a plurality of communication partners perform Point to Multi-Point (P2MP) communication, a beamforming antenna whose beam direction can be changed by electrical control from a controller is used. In addition, in the IEEE 802.1 lad standard, an optimum beam direction is explored when starting a communication and successively during the communication between the own station and the partner station.

In a wireless communication device conforming to the IEEE 802.11ad standard, for example, as described in U.S. Pat. No. 9,960,877, a search for a suitable beam direction is performed by a beamforming process such as a sector-level sweep (SLS) and a beam refinement protocol (BRP) phase. In the technique described in U.S. Pat. No. 9,960,877. usually, first at least one set of AWVs for realizing a quasi-omni beam pattern is used, and second, a standard beam table is used, in which the angular intervals of the beams are uniform.

According to the technique described in U.S. Pat. No. 9,960,877, when a plurality of beam patterns are sequentially switched and scanned over a certain angular range using a standard beam table including a series of beam patterns, the radiation direction of each designed beam pattern is made to be uniform in an angular interval.

However, the conventional wireless communication device stores a quasi-omni beam pattern on both the transmitting side and the receiving side. The quasi-omni beam pattern was essential on the receiving side, but not on the transmitting side.

SUMMARY OF THE INVENTION

The present invention has been made in view of the above circumstances, and is to provide a wireless communication device capable of reducing a difference in wireless signal quality between users as compared with the related art by effectively utilizing a beam pattern table on a transmission side.

An aspect of the present invention is a wireless communication device including a look-up table that stores a beam pattern table, and at least one beamforming antenna transmitting or receiving a radio signal with a beam pattern specified by a set of antenna weight vectors selected from the beam pattern table, and a number of antenna weight vectors for obtaining a beam pattern with a narrow half power beam width for transmission included in the beam pattern table is larger than a number of antenna weight vectors for obtaining a beam pattern with a narrow half power beam width for reception.

According to an aspect of the present invention, the number of beam tables for the transmission antenna is larger than the number of beam tables for the reception antenna. Thus, according to an aspect of the present invention, the angular interval between the adjacent beams can be narrowed by using one more beam pattern than in the related art. Thus, according to an aspect of the present invention, it is possible to reduce the deterioration of the gain in the valley between the beams. As a result, according to an aspect of the present invention, when a communication partner exists in the direction of a valley between beams, the communication quality with the communication partner can be improved as compared with the related art.

In the wireless communication device according to an aspect of the present invention, the beam pattern table may include a first beam pattern table and a second beam pattern table, the first beam pattern table may include a N number of antenna weight vectors for obtaining beam patterns with the narrow half power beam width for the transmission where N is an integer of two or more, and the second beam pattern table may include, antenna weight vectors for obtaining one quasi-omni beam pattern or a wide beam pattern, and a N−1 number of antenna weight vectors for obtaining a N−1 number of beam patterns with the narrow half power beam width for the reception.

In the wireless communication device according to an aspect of the present invention, in the beam pattern table, the angular interval between the adjacent beams may be smaller in the beam patterns with a narrow half power beam width for the transmission than in the beam patterns with a narrow half power beam width for the reception.

According to the aspects of the present invention described above, by effectively utilizing the beam pattern table on the transmitting side, it is possible to reduce a difference in wireless signal quality between users as compared with the related art.

BRIEF DESCRIPTION OF THE DRAWINGS

FIG. 5 is a diagram showing a configuration of a beam pattern table in the first example in a table format.

FIG. 8 is a diagram showing a configuration of a beam pattern table in a second example in a table format.

FIG. 11 is a diagram showing a configuration of a beam pattern table in a comparative example in a table format.

DETAILED DESCRIPTION OF THE PREFERRED EMBODIMENTS

Hereinafter, embodiments of the present invention will be described with reference to the drawings.
(Configuration Example of Wireless Communication System)

Figure 1:
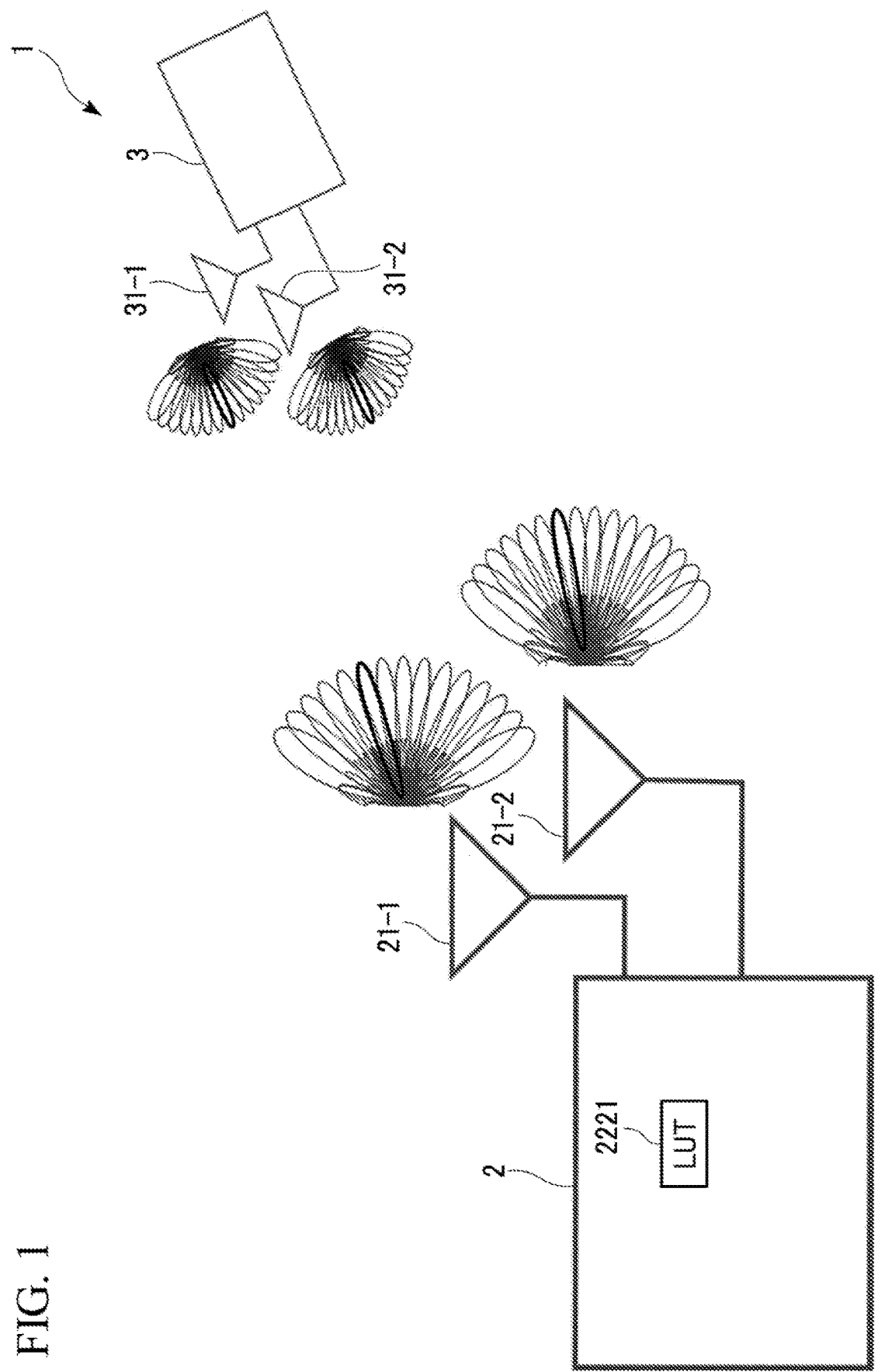
FIG. 1 is a diagram showing an example of a wireless communication system using a wireless communication device according to an embodiment.

FIG. 1 is a diagram showing an example of a wireless communication system using the wireless communication device according to the embodiment. As shown in FIG. 1, the wireless communication system 1 includes a first wireless communication device 2 (hereinafter, also simply referred to as a wireless communication device 2) and a second wireless communication device 3.

The first wireless communication device 2 is connected to an upper-level network such as a provider network via an optical fiber line or another communication line, and is thereby connected to a network such as the Internet. The first wireless communication device 2 is a wireless communication device installed by a service provider such as a WISP or a wireless communication carrier. The first wireless communication device 2 includes, for example, a reception beamforming antenna 21-1 and a transmission beamforming antenna 21-2. In the example shown in FIG. 1. the beamforming antenna 21-1 has fifteen beams, and the beamforming antenna 21-2 has sixteen beams. In addition, the first wireless communication device 2 includes an LUT 2221 that is a look-up table. The LUT 2221 will be described later.

The second wireless communication device 3 is installed at a user's house who uses a service provided by a service provider such as a WISP or a wireless communication carrier, for example. The second wireless communication device 3 includes, for example, a reception beamforming antenna 31-1 and a transmission beamforming antenna 31-2. In the example shown in FIG. 1, the beamforming antenna 31-1 has fifteen beams, and the beamforming antenna 31-2 has sixteen beams.

Although the example shown in FIG. 1 shows an example in which the first wireless communication device 2 and the second wireless communication device 3 include two beam antennas for transmission and reception, both the first wireless communication device 2 and the second wireless communication device 3 may include at least one beamforming antenna. When there is one beamforming antenna, the first wireless communication device 2 or the second wireless communication device 3 switch and use one antenna for transmission and reception.

Each of the first wireless communication device 2 and the second wireless communication device 3 includes a controller for executing beamforming inside the device. The first wireless communication device 2 and the second wireless communication device 3 recognize each other in the process of performing beamforming, select an appropriate beam, and select a Modulation and Coding Scheme (MCS) according to the quality of radio waves to perform wireless communication. In the following description, an example will be described in which the first wireless communication device 2 includes one beamforming antenna and includes a controller that executes beamforming inside the device.

Note that the first wireless communication device 2 and the second wireless communication device 3 are not limited to a service provider and a service user, and an organization such as a company or a public organization can use both as an internal network.

Explanation of Terms Used in Embodiment

Here, an outline of a wireless communication device that performs communication using a beamforming antenna and terms used in the embodiments will be described.

In the basic configuration of a beamforming antenna, by feeding each of the aligned antenna elements with a phase shifted signal so that radio waves with the same phase in the desired direction are radiated, and a beam with sharp directivity is radiated.

In designing a beam pattern of a beam that radiates a radio wave in a desired direction, the phase and the power to be supplied to each antenna element are determined by calculating the phase condition such that the radio waves radiated from the antenna element are interfered and intensified in a desired direction based on the arrangement of each antenna element of the antenna array, the distance between the antenna elements, the wavelength of the radiated radio wave, and the like.

A wireless communication device including a beamforming antenna includes a beam table constituted by a plurality of antenna weight vectors (AWVs). Here, the AWV indicates a vector representing the gain of the amplitude adjuster and the amount of phase shift of the variable phase shifter corresponding to each antenna element. When the beamforming antenna is configured by the n number of antenna elements, the n sets of AWVs indicates one beam pattern.

A calculation of the radiation directivity of the entire array antenna solely based on the AWV is referred to as an array factor. When the antenna element is an omnidirectional antenna, the array factor is the radiation pattern of the entire array antenna as it is. When the antenna element has directivity, the product of the array factor and the radiation pattern of the antenna element is the radiation pattern of the entire array antenna.
(Configuration Example of Wireless Communication Device)

Figure 2:
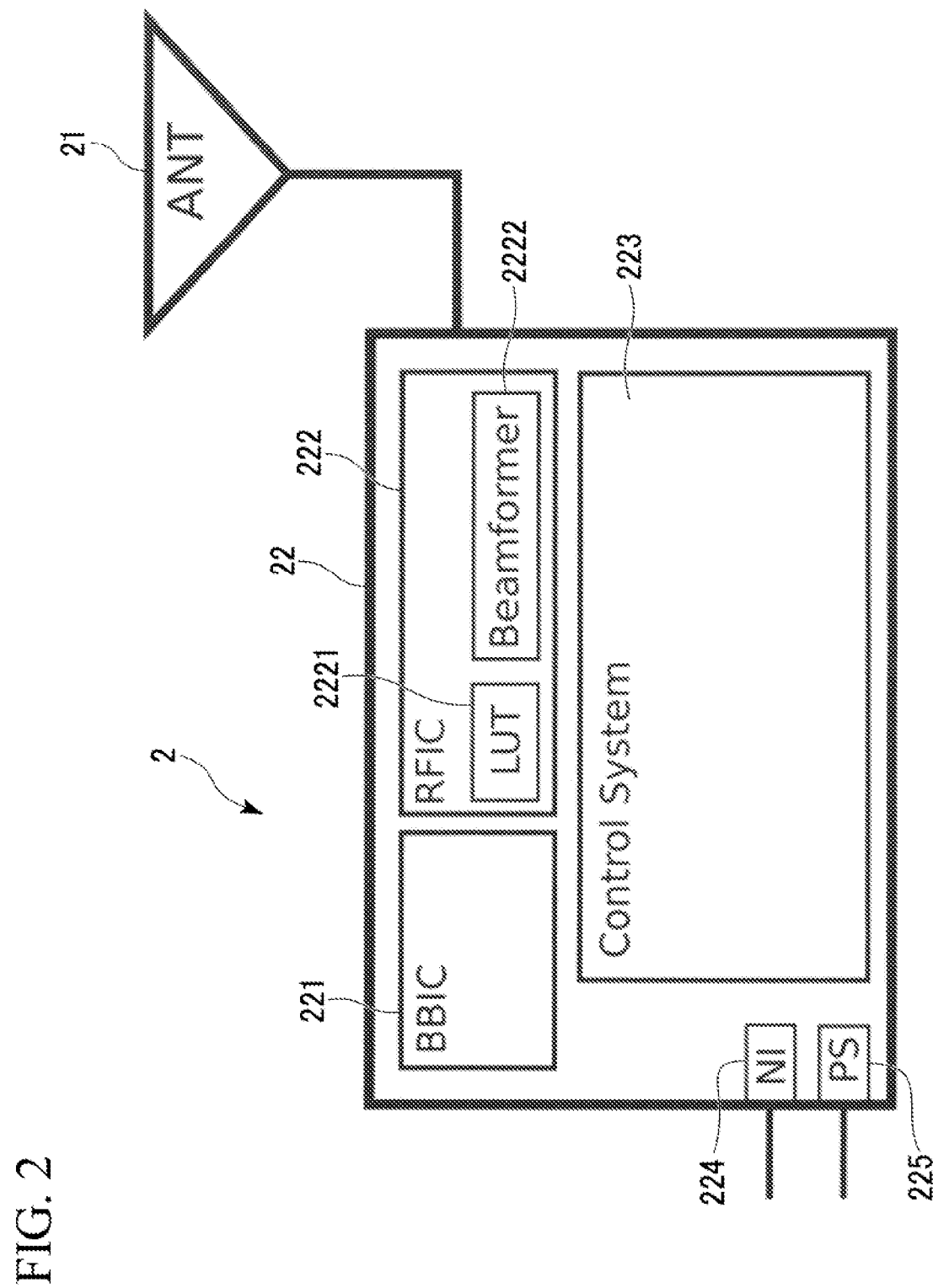
FIG. 2 is a block diagram showing a configuration example of a wireless communication device according to an embodiment.

FIG. 2 is a block diagram showing a configuration example of the wireless communication device according to the embodiment. As shown in FIG. 2, the wireless communication device 2 includes an antenna 21 and a controller 22.

The controller 22 includes a BBIC 221, an RFIC 222, a control system 223. a network interface (NI) 224, and a power supply (PS) 225.

The RFIC 222 includes an LUT 2221 and a beamformer 2222.

The antenna 21 is a digital phased array type beamforming antenna in which a plurality of elements are arranged and the plurality of elements can be electrically controlled by a set value of an antenna weight vector (AWV).

The BBIC 221 is, for example, a baseband integrated circuit. The BBIC 221 is a controller that processes a baseband signal, and mediates control of the RFIC 222 from the control system 223 in some cases.

The RFIC 222 is, for example, a radio frequency integrated circuit, is in charge of processing of high-frequency signals, transmits and receives millimeter-wave signals, and performs beamforming. The RFIC 222 sets the AWV by setting a numerical value in the LUT 2221.

The LUT 2221 accommodates a set of AWVs as a beam table. Note that each set of AWVs corresponds to one beam pattern and is composed of AWVs corresponding to the number of antenna elements. The LUT 2221 stores a transmission beam table (first beam pattern table) and a reception beam table (second beam pattern table). Further, the reception beam table is constituted by AWVs for obtaining a quasi-omni beam pattern or a wide beam pattern, and AWVs for obtaining the N−1 numbers of beam patterns with a narrower half power beam width that is one less than the N (N is an integer of two or more) numbers of AWVs for obtaining the beam pattern with a narrow half power beam width stored in the transmission beam table.

The beamformer 2222 controls feeding to the antenna element based on the set value of the AWVs.

The control system 223 is connected to an upstream network such as the Internet connected to the wireless communication device 2 via the NI 224. The control system 223 controls communication between the first network via the NI 224 and the second network connected via a communication line via the antenna 21 by controlling the BBIC 221 and the RFIC 222. The Control System 223 executes the control of the BBIC 221 and the RFIC 222 by referring to various databases according to, for example, a program. The control system 223 may include a Central Processing Unit (CPU), a System-on-a-Chip (SoC), an Application Specific Integrated Circuit (ASIC), and the like.

The NI 224 is a network interface for connecting the wireless communication device 2 to the upstream network.

The PS 225 is a power supplier, and supplies power supplied from the outside to each portion of the wireless communication device 2.

First Example

In the first example, an example will be described in which the LUT 2221 stores sixteen beam patterns for transmission and fifteen beam patterns for reception.

Figure 3:
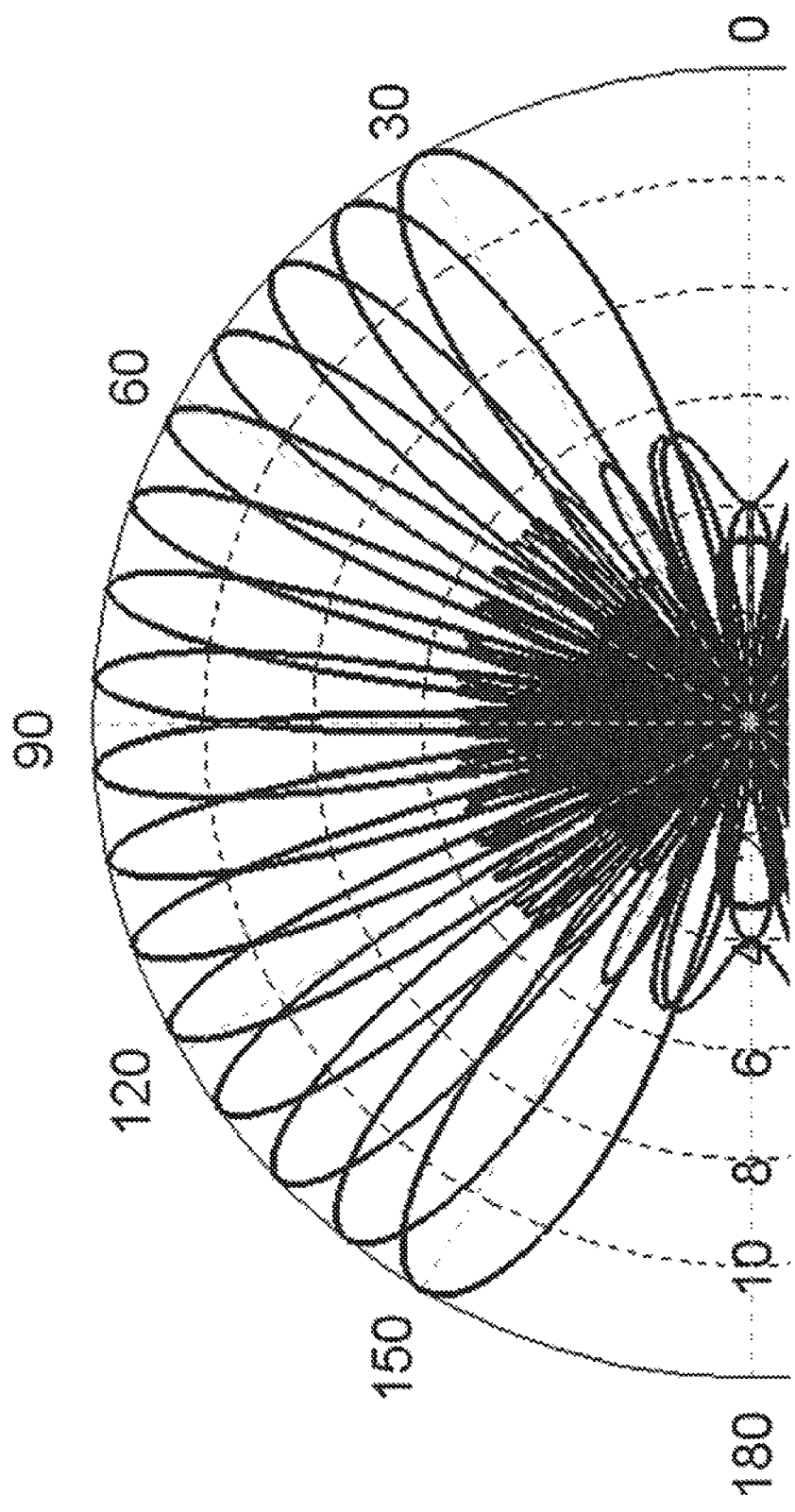
FIG. 3 is a diagram showing in polar coordinates, an array factor of a transmission beam table stored in the LUT according to the first example.
Figure 4:
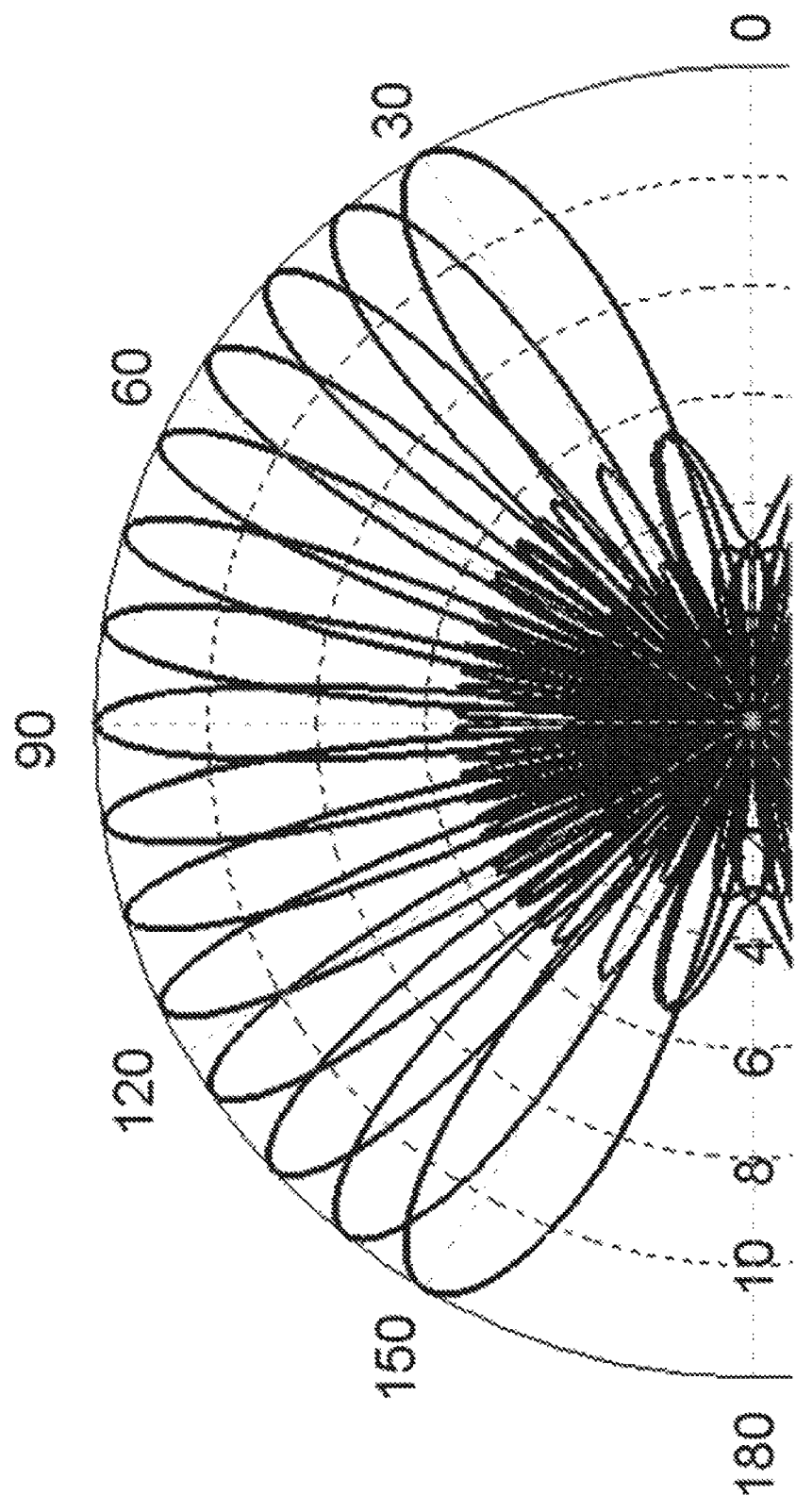
FIG. 4 is a diagram showing in polar coordinates, an array factor of a reception beam table stored in the LUT according to the first example.

FIG. 3 is a diagram showing the array factors of the transmission beam table stored in the LUT 2221 according to the present example in polar coordinates. FIG. 4 is a diagram showing the array factors of the reception beam table stored in the LUT 2221 according to the present example in polar coordinates. FIG. 5 is a diagram showing a configuration of a beam pattern table in the present example in a table format.

FIG. 3 shows sixteen array factors corresponding to TX0 to TX15 in FIG. 5, excluding quasi-omni beam pattern.

FIG. 4 shows fifteen array factors corresponding to RX to RX15 in FIG. 5. Since RX0 is a quasi-omni beam pattern, RX0 is not shown in FIG. 4.

In the first example, the target direction of each beam is determined by setting the beam interval to be uniform with respect to the angular range to be covered, the beam pattern is designed. and a set of AWVs for realizing the beam pattern is designed. The design is performed by, for example, a designer of the wireless communication device 2. The LUT 2221 stores the beam pattern designed as described above.

As shown in FIG. 5, unlike the related art, the LUT 2221 does not store quasi-omni beam pattern and stores sixteen beam patterns (TX0 to TX15) with a narrow half power beam width as a transmission beam table. In addition, the LUT 2221 stores, as a reception beam table, the quasi-omni beam pattern of RX0 and fifteen beam patterns (RX1 to RX15) with a narrow half power beam width. In the embodiment, the angular range of the transmission beam table and the angular range of the reception beam table are the same.

Regarding the transmission beam table, a beam table that realizes sixteen beam patterns was configured by a series of sixteen sets of AWVs. In an antenna array, the sixteen antenna elements are arranged in a single row, and the alignment direction is the directions of 0 degrees and 180 degrees in FIGS. 3 and 5. Note that 90 degrees is a direction perpendicular to the alignment direction of the antenna elements.

Regarding the reception beam table, a beam table that realizes fifteen beam patterns is configured by a series of fifteen sets of the AWVs.

In the examples shown in FIGS. 3 to 5, the angular range of 120 degrees from the direction of 30 degrees to the direction of 150 degrees is covered. The interval between the angles of the beams was 8.6 degrees in the reception beam table and 8.0 degrees in the transmission beam table.

Note that the array factor is line-symmetric with respect to a line from 0 degrees to 180 degrees. For this reason, in FIGS. 3 and 4, 180 degrees to 360 degrees are omitted.

The conditions for designing the AWV and calculating the array factor were as follows: the operating frequency was 60.48 GHz, and the sixteen planar patch antennas were arranged in a single row at half-wavelength intervals. The resolution of the phase adjuster was 8 bits (256 levels).

As described above, according to the first example, regarding the direction of the valley between the adjacent beams in which the gain becomes weak, the directions in which the gain becomes the weakest are the 85.7-degree direction and the 94.3-degree direction in the reception beam table, and the gain of the array factor is 9.08 dB. Further, according to the first example, in the transmission beam table, the 90-degree direction is the weakest, and the gain of the 90-degree array factor is 9.54 dB, so that the deterioration is reduced as compared with the reception beam table.

Although FIGS. 3 to 5 show an example in which the angular range of 120 degrees is covered from the direction of 30 degrees to the direction of 150 degrees, the angular range to be covered may be another angular range, and any angular range is acceptable according to the usage.

Second Example

In the second example, an example will be described in which the LUT 2221 stores thirty-two beam patterns for transmission and thirty-one beam patterns for reception. The design conditions are the same as in the first example.

Figure 6:
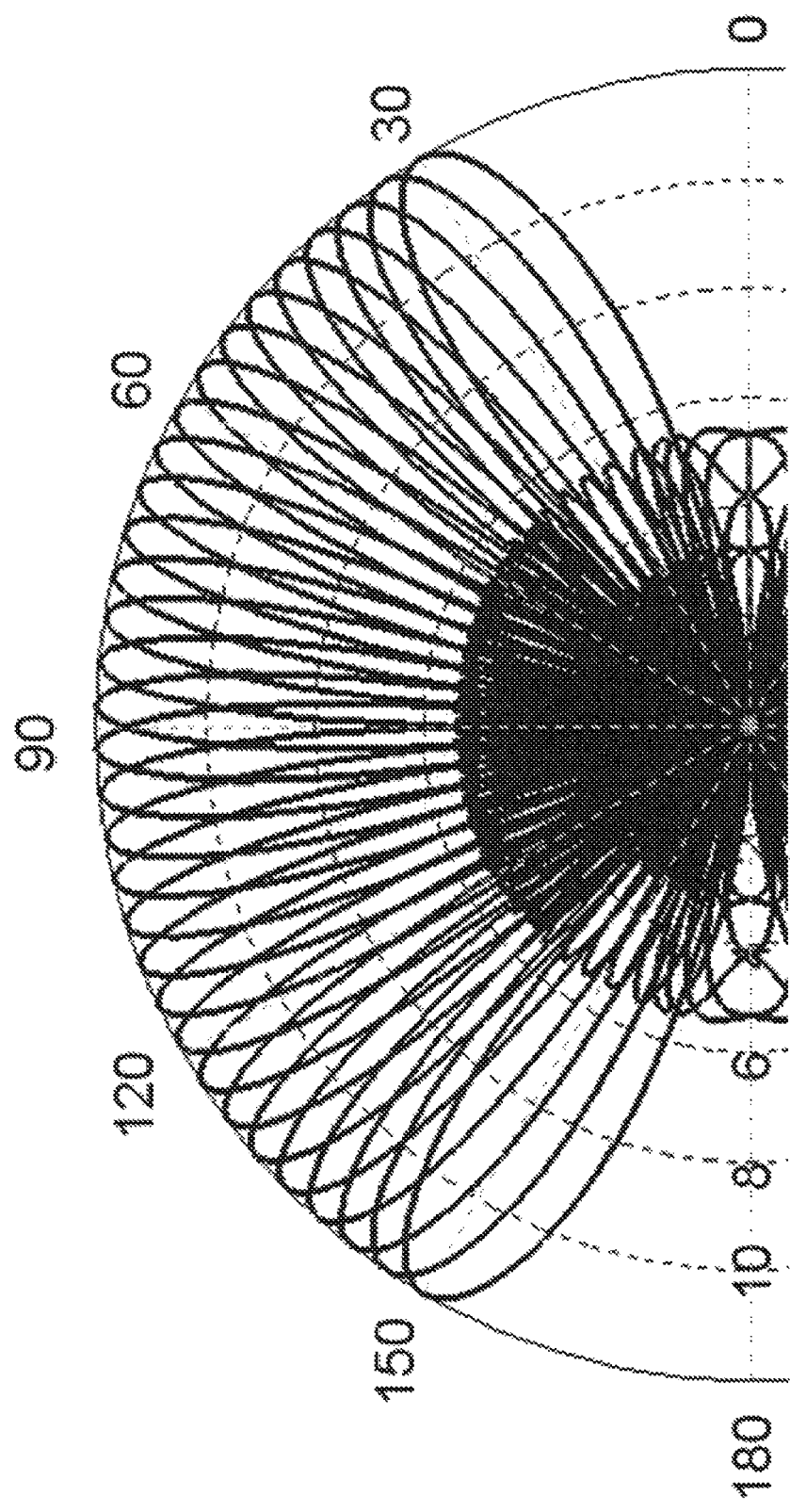
FIG. 6 is a diagram showing in polar coordinates, an array factor of a transmission beam table stored in the LUT according to the second example.
Figure 7:
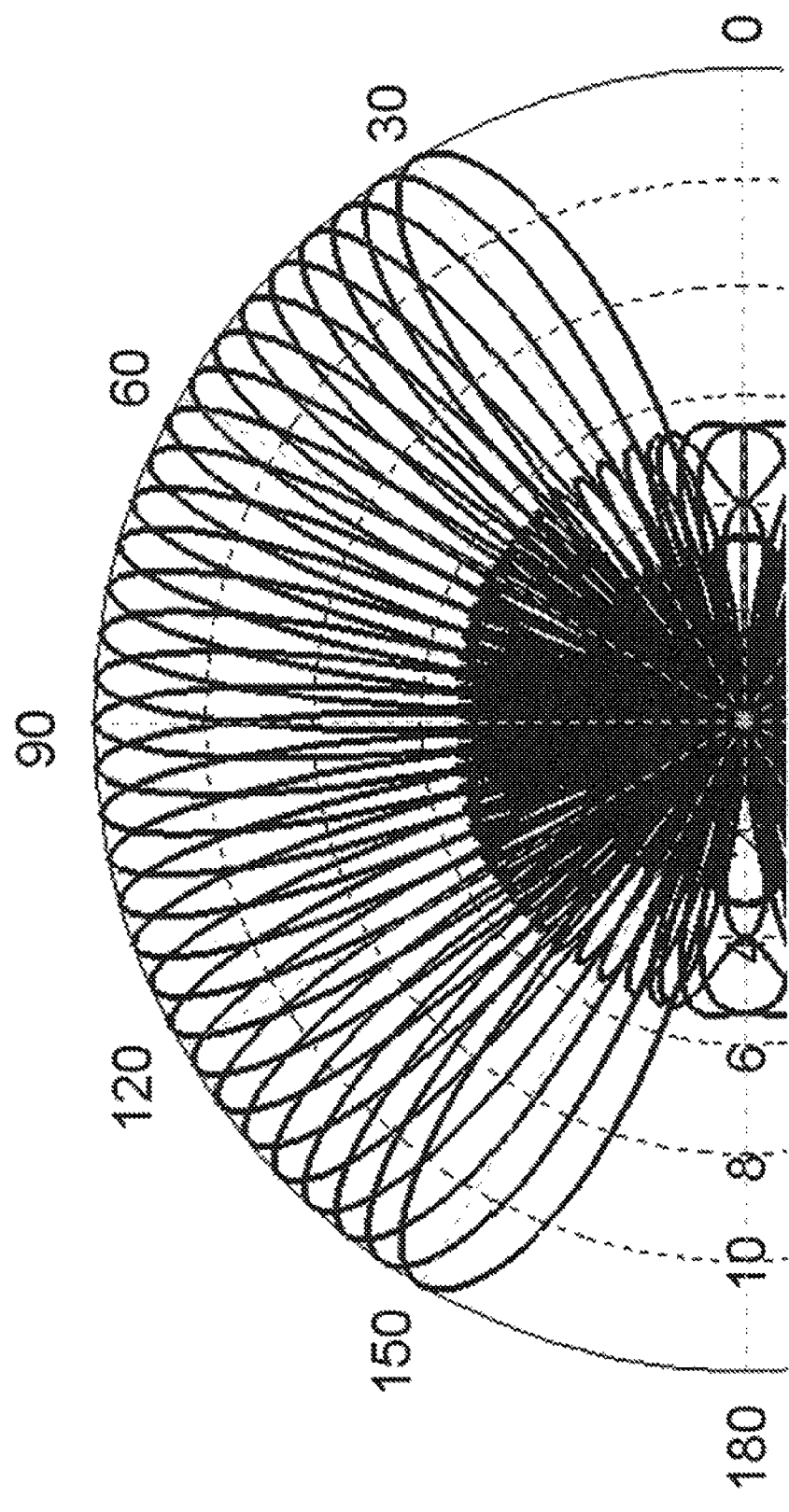
FIG. 7 is a diagram showing in polar coordinates, an array factor of a reception beam table stored in the LUT according to the second example.

FIG. 6 is a diagram showing the array factors of the transmission beam table stored in the LIT 2221 according to the present example in polar coordinates. FIG. 7 is a diagram showing the array factors of the reception beam table stored in the LUT 2221 according to the present example in polar coordinates. FIG. 8 is a diagram showing a configuration of a beam pattern table in the present example in a table format.

FIG. 6 shows thirty-two array factors corresponding to TX0 to TX31 in FIG. 8, excluding a quasi-omni beam pattern.

FIG. 7 shows thirty-one array factors corresponding to RX1 to RX31 in FIG. 8. Since RX0 is a quasi-omni beam pattern, RX0 is not shown in FIG. 7.

In the second example, the target direction of each beam is determined by setting the beam interval to be uniform with respect to the angular range to be covered, a beam pattern is designed, and a set of AWVs for realizing the beam pattern is designed. The design is performed by, for example, a designer of the wireless communication device 2. The LUT 2221 stores the beam pattern designed as described above.

As shown in FIG. 8. unlike the related art, the LUT 2221 does not store quasi-omni beam pattern and stores thirty-two beam patterns (TX0 to TX31) with a narrow half power beam width as a transmission beam table. In addition, the LUT 2221 stores, as a reception beam table, the quasi-omni beam pattern of RX0 and thirty-one beam patterns (RX1 to RX31) with a narrow half power beam width.

Regarding the transmission beam table, a beam table that realizes thirty-two beam patterns was configured by a series of thirty-two sets of AWVs. In an antenna array, the thirty-two antenna elements are arranged in a single row, and the alignment direction is the directions of 0 degrees and 180 degrees in FIGS. 6 and 7. Note that 90 degrees is a direction perpendicular to the alignment direction of the antenna elements.

Regarding the reception beam table, a beam table that realizes thirty-one beam patterns is configured by a series of thirty-one sets of the AWVs.

In the examples shown in FIGS. 6 to 8. the angular range of 120 degrees from the direction of 30 degrees to the direction of 150 degrees is covered. The interval between the angles of the beams was 4.0 degrees in the reception beam table. and 3.9 degrees in the transmission beam table.

As described above, according to the second example, regarding the direction of the valley between the adjacent beams in which the gain becomes weak, the directions in which the gain becomes the weakest are the 88.0-degree direction and the 92.0-degree direction in the reception beam table, and the gain of the array factor is 11.47 dB. Further, according to the second example, in the transmission beam table, the 90-degree direction is the weakest, and the gain of the array factor thereof is 11.52 dB, so that the deterioration is reduced as compared with the reception beam table.

Comparative Example

Here, an example of an array factor of a beam table used in a wireless communication system using the related art will be described.

Figure 9:
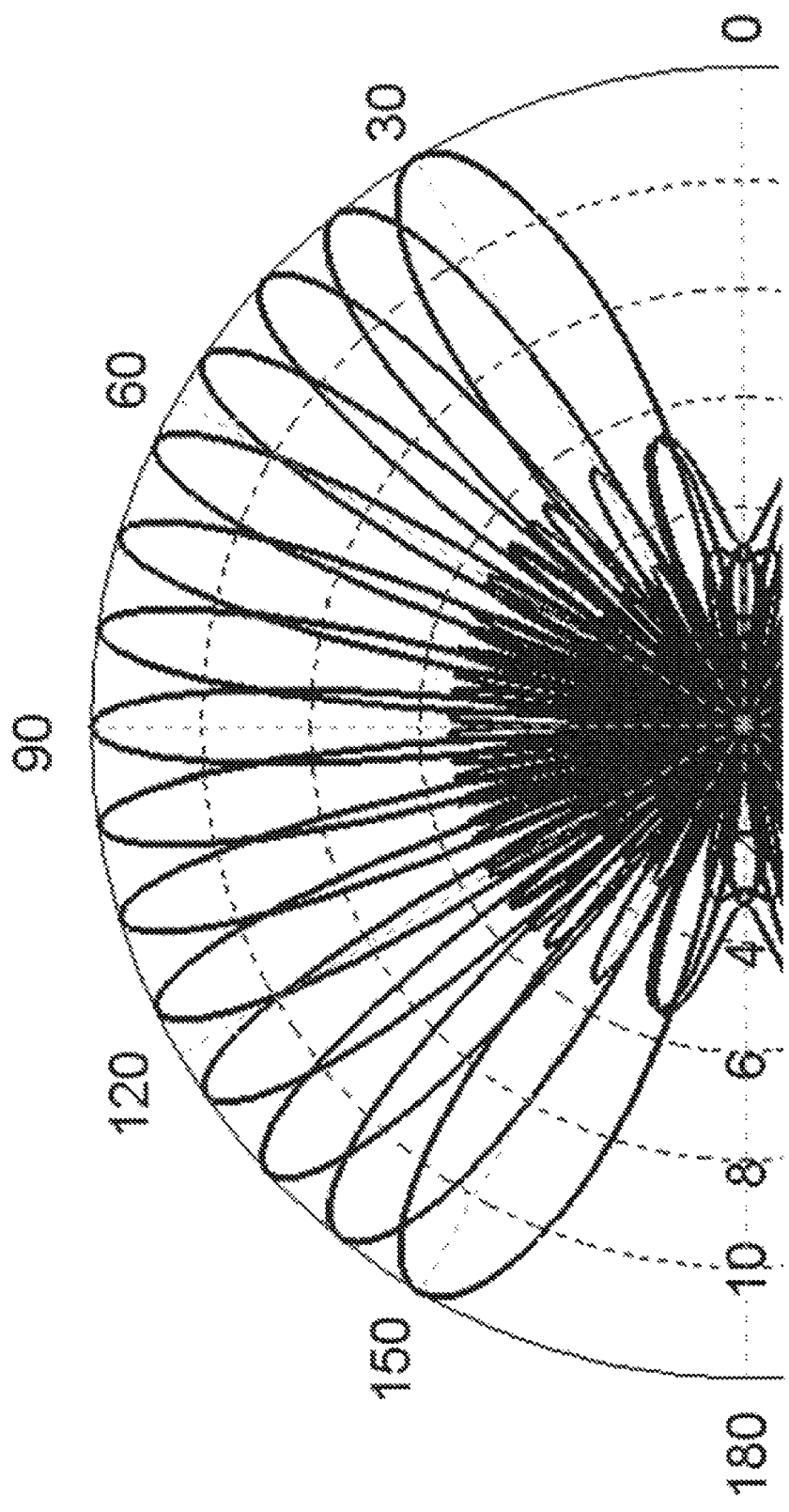
FIG. 9 is a diagram showing an array factor of a transmission beam table in a comparative example in polar coordinates.
Figure 10:
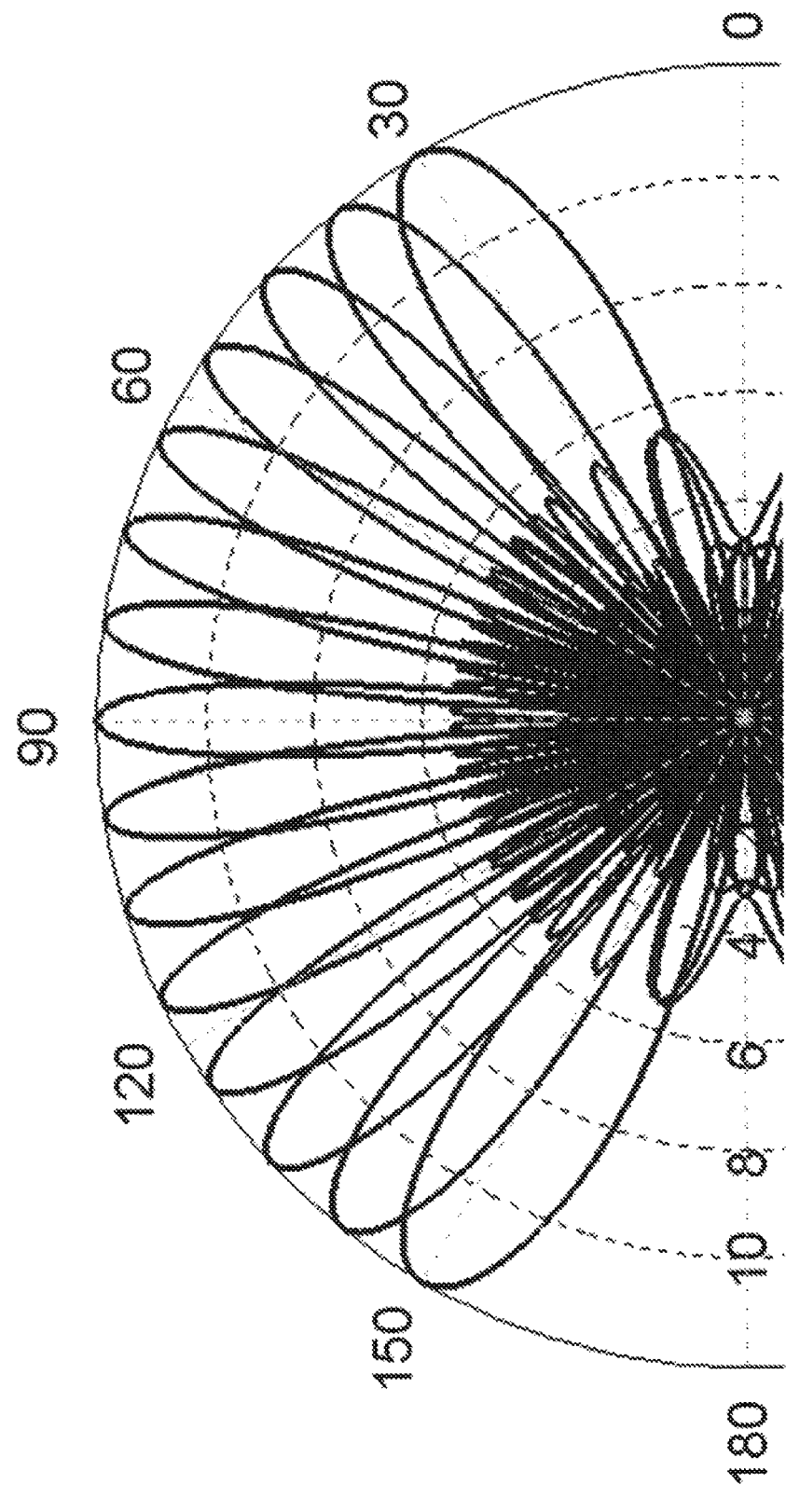
FIG. 10 is a diagram showing an array factor of a reception beam table in a comparative example in polar coordinates.

FIG. 9 is a diagram showing the array factor of the transmission beam table in the comparative example in polar coordinates. FIG. 10 is a diagram showing the array factors of the reception beam table in the comparative example in polar coordinates. FIG. 11 is a diagram showing a configuration of a beam pattern table in a comparative example in a table format.

In the comparative example, the LUT stores one quasi-omni beam pattern in both the transmission beam table and the reception beam table, and stores fifteen beams with a narrow half power beam width for the transmission beam table and fifteen beams for the reception beam table.

In the comparative example, the angular interval between the beams is 8.6 degrees in both the transmission beam table and the reception beam table.

Regarding the direction of the valley between the adjacent beams in which the gain becomes weak, the directions in which the gain becomes the weakest are the 85.7-degree direction and the 94.3-degree direction in both the transmission beam table and the reception beam table, and the gain of the array factor is 9.08 dB.

As described above, in the related art, when the N (N is an integer of two or more) number of the beam patterns can be stored in the LUT. one quasi-omni beam pattern and the N-1 number of the beams with narrow half power beam width are stored in the LUT. In the related art, based on the above, the design was performed to cover a certain angular range.

The quasi-omni beam pattern is indispensable to the table of the reception antenna in the process of searching for a suitable beam direction, but is not essential to the table of the transmission antenna.

Therefore, in the present embodiment, as in the first and second examples described above, in the beam pattern table for the transmission antenna, the quasi-omni beam pattern is not stored and all beams are stored in the LUT as beams with a narrow half power beam width. That is, in the present embodiment, the number of beam tables having a narrow half power beam width for transmission is greater than the number of beam tables having a narrow half power beam width for reception. In the present embodiment, as in the first and second examples, the angular interval between the beams is smaller in the transmission beam table than in the reception beam table.

In the first and second examples described above, the example has been described in which the beam table for the reception antenna stores a quasi-omni beam pattern, but the AWV of a wide beam pattern may be stored.

In the example described above, the number of the beam pattern tables of the reception antenna is sixteen or thirty-two. but the present invention is not limited to this. The number may be less than sixteen or more than thirty-two.

As described above, according to the present embodiment, the number of beam tables for the transmission antenna is larger than the number of beam tables for the reception antenna. Thus, according to the present embodiment, the angular interval between the adjacent beams can be narrowed by using one more beam pattern than in the related art. Thus, according to the present embodiment, it is possible to reduce the deterioration of the gain in the valley between the beams. As a result, according to the present embodiment, when a communication partner exists in the direction of a valley between beams, the communication quality with the communication partner can be improved as compared with the related art.

As described above, the embodiments for carrying out the present invention have been described using the embodiments. However, the present invention is not limited to these embodiments, and various modifications and substitutions can be made without departing from the scope of the present invention.

What is claimed is:

1. A wireless communication device comprising:
a look-up table that stores a beam pattern table; and
at least one beamforming antenna transmitting or receiving a radio signal with a beam pattern specified by a set of antenna weight vectors selected from the beam pattern table,
wherein a number of antenna weight vectors for obtaining a beam pattern with a narrow half power beam width for transmission included in the beam pattern table is larger than a number of antenna weight vectors for obtaining a beam pattern with a narrow half power beam width for reception.

2. The wireless communication device according to claim 1, wherein:
the beam pattern table comprises a first beam pattern table and a second beam pattern table;
the first beam pattern table comprises a N number of antenna weight vectors for obtaining beam patterns with the narrow half power beam width for the transmission where N is an integer of two or more; and
the second beam pattern table comprises, antenna weight vectors for obtaining one quasi-omni beam pattern or a wide beam pattern, and a number N-1 of antenna weight vectors for obtaining a number N–1 of beam patterns with the narrow half power beam width for the reception.

3. The wireless communication device according to claim 2, wherein
in the beam pattern table, the angular interval between adjacent beams is smaller in the beam patterns with a narrow half power beam width for the transmission than in the beam patterns with a narrow half power beam width for the reception.

4. The wireless communication device according to claim 1, wherein
in the beam pattern table, the angular interval between adjacent beams is smaller in the beam patterns with a narrow half power beam width for the transmission than in the beam patterns with a narrow half power beam width for the reception.

* * * * *